Patented Feb. 2, 1943

2,309,845

UNITED STATES PATENT OFFICE 2,309,845

PROCESS FOR THE RECOVERY OF NITRIC OXIDE AND HYDROCARBONS FROM GASEOUS MIXTURES

Edward B. Hodge, Terre Haute, Ind., assignor to Commercial Solvents Corporation, Terre Haute, Ind., a corporation of Maryland No Drawing. Application April 8, 1940, Serial No. 328,527

4 Claims. (Cl. 23—161)

My invention relates to the recovery of nitric oxide and hydrocarbons from gaseous mixtures, and more specifically to the recovery of nitric oxide and paraffin hydrocarbons from the gaseous reaction products resulting from the vapor phase nitration of paraffin hydrocarbons.

The paraffin hydrocarbons and especially those of low molecular weight, may be successfully nitrated in the vapor phase, for example, in accordance with the procedures of U. S. Pats. 1,967,667 and 2,071,122 of H. B. Hass et al., 2,161,475 and 2,164,774 of G. K. Landon, and co-pending application, Serial No. 98,634 by H. B. Hass and E. B. Hodge. In accordance with these procedures, the hydrocarbon is mixed with nitric acid or nitrogen dioxide, preferably having a considerable molar excess of hydrocarbon, and the resulting mixture is passed through a heated reaction chamber. The reaction products include, as well as nitroparaffins, unreacted paraffin hydrocarbons and carbon oxides. In all cases there is a substantial proportion of nitric oxide in the gaseous reaction products, and since nitric acid or nitrogen dioxide are the most expensive raw materials used in the process, it is evident that recovery of the nitric oxide, for conversion to nitrogen dioxide or nitric acid, is economically desirable.

It has previously been proposed to recover nitric oxide from the gaseous reaction products by scrubbing with an acid solution of ferrous sulfate, and subsequently liberating nitric oxide from the scrub liquor by the use of high temperatures or low pressures, or both. This process, however, entails serious corrosion difficulties, and the expense of handling large volumes of scrub liquor at high temperatures or low pressures, makes this procedure commercially undesirable.

Since the purpose of recovering nitric oxide from the reaction products is to re-oxidize it to nitrogen dioxide for re-use in the process, there also exists the possibility of oxidizing the nitric oxide in the presence of some of the remaining constituents of the gaseous mixture. For example, after removal of the hydrocarbons, which constitute the bulk of the gas mixture, the remaining mixture of nitric oxide and carbon oxides might possibly be directly subjected to oxidation. However, when sufficient air or oxygen is added to such mixtures to effect the oxidation of the nitric oxide, inflammable or explosive mixtures are produced. This obviously precludes the use of such a process.

I have now discovered, however, that the nitric oxide in the gaseous reaction products may be safely oxidized if sufficient hydrocarbon is provided in the reaction mixture to secure a non-inflammable mixture of such gases with air or oxygen in the amounts necessary for the oxidation reaction. In accordance with my process, therefore, the nitric oxide in the gaseous reaction products is oxidized prior to the removal of the unreacted hydrocarbon, and if this unreacted hydrocarbon is not present in sufficient quantities to secure a non-inflammable mixture with the amount of air or oxygen employed, additional hydrocarbon is introduced into the mixture prior to incorporation of the air or oxygen. After the oxidation of the nitric oxide, the resulting nitrogen dioxide may be easily removed from the gas mixture by known methods. To successfully oxidize nitric oxide by the introduction of substantial quantities of oxygen and in the presence of a mixture of a number of highly combustible gases, i. e., alkanes, alkenes, and carbon monoxide, is entirely contrary to the results which one would normally expect in view of the present knowledge in regard to the explosive characteristics of such mixtures. The results obtained are also surprising in view of the fact that after the oxidation reaction there is present a large amount of nitrogen dioxide which is a strong oxidizing agent and which is capable of forming unstable spontaneously decomposable compounds by its action on the alkanes in the reaction mixture.

My process of removing the nitric oxide from the gas mixture in the above manner, prior to removing the unreacted hydrocarbon, makes possible the subsequent recovery of the unreacted hydrocarbon from the residual gases without any explosive hazards. After removal of the nitrogen dioxide from the gas mixture, the residual gases may be compressed and cooled to liquefy the hydrocarbon, or may be scrubbed with light oil to absorb the hydrocarbon, or treated in other known ways to effect this separation. It is thus seen that my process makes possible safe and efficient recovery of both the unreacted hydrocarbon and the partially reacted nitrating agent for re-use in the nitration reaction.

The amount of hydrocarbon required to secure a non-inflammable mixture for the oxidation reaction will depend upon the proportion of nitric oxide in the gaseous reaction products, and upon the amount of air or oxygen to be utilized for the oxidation reaction. The minimum amount of hydrocarbon necessary for this purpose, with any given mixture of hydrocarbon, air, and nitrogen dioxide, may be determined from the chart constituting Figure II of my paper "Limits of Flammability of Mixtures of Propane, Air, and Nitrogen Dioxide," (Ind. and Eng. Chem. 30, 1390). The region of flammability, shown on this chart for propane, approximates that for all of the lower hydrocarbons, and a safe operating mixture, as indicated by this chart for propane, will likewise be safe for hydrocarbons of from 1 to 5 carbon atoms. By the term "safe," in this connection, is meant a mixture containing a sufficient excess of hydrocarbon over that present at the actual flammable limit to provide the usual factor of safety for commercial operations. In general it may be said that the reaction mixture for the oxidation reaction, after incorporation of the air or oxygen, should contain at least 40% by weight of hydrocarbon, and preferably at least 60% by weight.

My process is applicable to the reaction products from the nitration of any paraffin hydrocarbon which exists in the gaseous or vapor state, under the reaction conditions employed in the oxidation reaction. Since it is preferred to operate the oxidation reaction at relatively low temperatures, and at super-atmospheric pressures, my invention is especially applicable to reaction products from the nitration of paraffins containing from 1 to 3 carbon atoms. However, under operating conditions which will maintain the higher hydrocarbons in the gaseous state, my process may also be applied to reaction products from the nitration of butane, pentane, or the like.

In order to maintain the necessary amount of hydrocarbon in the gaseous phase, and thus prevent the formation of flammable mixtures, the pressure and temperature throughout the process should not reach the "dew point" for the minimum protective concentration of hydrocarbon. In the case of propane, for example, a pressure of 150 lbs. per sq. in. (gauge) and a temperature of $-10°$ C., may be taken as a practical limit, with higher temperatures permitting higher pressures. Similarly, for butane, a pressure of 25 lbs. per sq. in. (gauge) and a temperature of $-10°$ C. may be taken as a practical limit, with higher temperatures permitting the use of higher pressures. In the case of ethane and methane, of course, much higher pressures may be employed at corresponding temperatures.

The gaseous reaction products from the nitration reaction, remaining after recovery of the bulk of the nitroparaffins by condensation, are preferably, but not necessarily, subjected to water scrubbing prior to effecting the oxidation of the nitric oxide. This water scrubbing, which may suitably be carried out in accordance with the procedure of U. S. Patent 2,150,123 of J. Martin and E. B. Hodge, serves to remove aldehydes, ketones, residual nitroparaffins and other water-soluble materials from the gaseous mixture.

The oxidation reaction may be effected in accordance with prior practices in this regard, for example, in accordance with the procedure commonly used in ammonia oxidation plants for the production of nitric acid. The reaction is effected simply by mixing air or oxygen with the gaseous mixture containing the nitric oxide, and passing the resulting mixture through a reaction chamber at a rate sufficiently slow to obtain substantially complete reaction. Low temperatures and high pressures increase the velocity of the reaction, and for this reason a combination of both is preferable. Refrigeration is usually not warranted from a cost standpoint, and prevailing atmospheric temperatures or cooling-water temperatures may be satisfactorily employed. Increase in pressure very greatly increases the space velocity, but here again compression of the gases above the pressure employed for the nitration reaction is usually not warranted from a cost standpoint. Any pressure which may be employed for the nitration reaction itself will be satisfactory for the oxidation reaction if the space velocity is adjusted in accordance with known practices to insure complete reaction at the pressure employed.

Oxygen or an oxygen-containing gaseous mixture free from constituents which would interfere with the reaction or the subsequent recovery operations, may be used as the oxidizing agent. Air is completely satisfactory in this respect, and it is unnecessary to employ any more expensive oxidizing medium. The amount of oxygen theoretically required for the oxidation is shown by the following equation:

$$2NO + O_2 = 2NO_2$$

However, if the resulting nitrogen dioxide is to be recovered by absorption in water to form nitric acid, the amount of oxygen theoretically required for the reactions involved, is represented by the following equations:

$$4NO + 2O_2 \rightarrow 4NO_2$$
$$4NO_2 + O_2 + 2H_2O \rightarrow 4HNO_3$$

which may be expressed by the single equation:

$$4NO + 3O_2 + 2H_2O \rightarrow 4HNO_3$$

Any amount of air, from the theoretical requirement to a very considerable excess over this, may be used. Unduly excessive amounts of air entail the expense of handling unnecessarily large volumes of gases, and too large an excess of air will, of course, reduce the hydrocarbon content of the mixture sufficiently to produce a flammable mixture. I prefer, therefore, to use amounts of air ranging from the theoretical amount to 100% in excess of this, and preferably an amount representing 10%–50% in excess of the theoretical amount.

At the conclusion of the oxidation reaction the resulting nitrogen dioxide may be recovered in any suitable manner, as, for example, by fractional condensation of the gas mixture. Since it is usually desirable to recycle the recovered nitrogen dioxide in the process, the gas may be absorbed in water to form nitric acid, if nitric acid constitutes the nitrating agent used in the nitration reaction. This absorption step may conveniently be used to recover the nitrogen dioxide from the gas mixture leaving the oxidizing chamber. For this purpose the usual type of absorption tower may be used, and prior practices may be followed in all respects. Here, again, low temperature is desirable in order to obtain nitric acid of high concentration, but refrigeration is usually unwarranted from a cost standpoint. Available cooling-water temperatures will usually be satisfactory, and nitric acid of satisfactory strength for recycling in the process can be obtained at usual prevailing atmospheric temperatures. After absorption of the bulk of the nitrogen dioxide by water scrubbing, the remaining traces may be removed from the gas mixture by scrubbing with an alkaline medium, as, for example, aqueous caustic soda, or soda ash. This is particularly desirable if the hydrocarbon is to be recovered from the residual gases, since even small amounts of nitrogen dioxide may cause serious corrosion in subsequent recovery apparatus, due to the presence of water vapor in the gases leaving the water scrubber, resulting in nitric acid formation in the residual gas mixture. Various modified methods for recovering the nitrogen dioxide from the gas mixture will of course be evident to those skilled in the art, and my invention is not limited to any particular method in this regard.

After removal of the nitrogen dioxide from the gas mixture, the hydrocarbons may be separated from the residual gases by any suitable means. For example, the gas mixture may be refrigerated, or compressed further and then cooled, to liquefy the hydrocarbons; or the hydrocarbons may be removed from the gas mixture by scrubbing with a light oil such as kerosene and recovered from the latter by distillation. The unsaturated hydrocarbons may be separated from the paraffin hydrocarbon by known methods, or may be hydrogenated to form paraffin hydrocarbons, for example, in accordance with the process of my U. S. Patent 2,150,120. The residual gases, after recovery of the hydrocarbons, comprise carbon oxides, the excess oxygen employed in the oxidation reaction, and nitrogen, if air was utilized as the oxidizing agent. These gases may be further separated if desired, but their recovery is usually not warranted from an economic standpoint.

My invention may be further illustrated by the following specific example:

*Example*

The reaction products from the vapor phase nitration of propane by means of nitric acid, (approximately 3.5 moles propane per mole of nitric acid) were cooled to condense the bulk of the nitroparaffins, and the resulting gas mixture was then subjected to water scrubbing, by passing the gases through a bubble cap column counter-current to water introduced at approximately 20° C. The resulting gas mixture had approximately the following analysis:

| | Per cent by volume |
|---|---|
| Propane | 84.5 |
| Nitric oxide | 10.5 |
| Propylene and ethylene | 2.5 |
| Carbon monoxide | 1.5 |
| Carbon dioxide | 1.0 |

This gas mixture, at a temperature of about 20° C., was mixed with air at the same temperature at a rate of approximately 165 cubic feet of air per hour for 360 cubic feet of gas mixture per hour. The resulting mixture was passed through an oxidation chamber at a rate of approximately 800 cu. ft. per hour per cubic foot of reaction space. The exit gas mixture was found to have a temperature of approximately 60° C., due to the exothermic nature of the reaction. This gas was cooled to approximately 20° C., and passed through a 33-plate bubble-cap column countercurrent to water entering at a temperature of approximately 20° C. The rate of water flow was controlled so as to obtain, as the solution leaving the column, nitric acid of approximately 1.30 specific gravity. In a continuous process involving the initial rates of gas flow specified above, water introduced into the column at approximately 1 gal. per hour was found to produce nitric acid of approximately 1.30 specific gravity. The gas mixture leaving the column was found to have approximately the following analysis:

| | Per cent by volume |
|---|---|
| Propane | 66.1 |
| Nitrogen | 28.7 |
| Propylene and ethylene | 1.9 |
| Carbon monoxide | 1.2 |
| Oxygen | 1.0 |
| Carbon dioxide | 0.8 |
| Nitrogen dioxide | 0.3 |

This gas mixture was then passed through a 30-plate bubble-cap column countercurrent to a soda ash solution, (approximately 5.3% soda ash by weight), entering the column at approximately 20° C. The gas was passed through the column at a rate of approximately 460 cubic feet per hour, while introducing the soda ash solution at a rate of approximately 10 gal. per hour. The resulting gas mixture had approximately the following composition:

| | Per cent by volume |
|---|---|
| Propane | 66.8 |
| Nitrogen | 29.0 |
| Propylene and ethylene | 2.0 |
| Carbon monoxide | 1.2 |
| Oxygen | 1.0 |

This gas mixture was then passed through a 35-plate bubble-cap column, countercurrent to kerosene. The gas was passed through the column at a rate of approximately 455 cubic feet per hour, while introducing the kerosene at a rate of approximately 78 gal. per hour. The kerosene solution of the hydrocarbons leaving the column was distilled to recover a hydrocarbon mixture of the following approximate composition:

| | Per cent by volume |
|---|---|
| Propane | 97 |
| Propylene and ethylene | 3 |

The residual gases leaving the kerosene scrubbing column, comprising carbon monoxide, oxygen, nitrogen, and any remaining hydrocarbons, were vented to the atmosphere.

In the above example the gases were maintained at a pressure of approximately 80 lbs. per sq. in. (gauge) throughout the entire process, but volumes specified are based on atmospheric pressure and 20° C.

It is to be understood, of course, that the above example is merely illustrative and does not limit the scope of my invention. Gaseous reaction products from the nitration of other paraffin hydrocarbons and using other nitration conditions, may be satisfactorily treated by my process, if sufficient paraffin hydrocarbon is provided to prevent the formation of flammable mixtures, and if the paraffin hydrocarbon remains in the gaseous state during the oxidation and during recovery of the resulting nitrogen dioxide. Also, the conditions for the oxidation of the nitric oxide, and for the recovery of the resulting nitrogen dioxide, may be varied in numerous respects in accordance with prior practices. My process may also be used in conjunction with other gas recovery or purification steps. In general, it may be said that the use of any equivalents or modifications of procedure, which would naturally occur to one skilled in the art, is included in the scope of my invention.

My invention now having been described, what I claim is:

1. In a process for recovering nitric oxide from gaseous reaction products of the vapor phase nitration of an alkane, said gaseous reaction products containing unreacted alkane, alkenes, carbon monoxide, and nitric oxide, which comprises providing in said gaseous mixture sufficient of said alkane to prevent the formation of a flammable mixture on admixture of oxygen to oxidize said nitric oxide; incorporating an excess of oxygen in said mixture over that necessary to oxidize said nitric oxide, but insufficient to form a flammable mixture, effecting reaction between said oxygen and said nitric oxide, recovering nitrogen dioxide from the resulting gas mixture, and maintaining said alkane and alkenes in the gaseous phase throughout said oxidation and recovery steps.

2. A process for recovering nitric oxide from gaseous reaction products of the vapor phase nitration of an alkane having from 1 to 3 carbon atoms, said gaseous reaction products containing unreacted alkane, alkenes, carbon monoxide, and nitric oxide, the alkane being present in a major quantity, which comprises providing in said gaseous mixture sufficient of said alkaline to constitute at least 40% by weight of the resulting gas mixture after incorporating sufficient oxygen in said mixture to oxidize said nitric oxide, then incorporating an excess of oxygen over that necessary to oxidize said nitric oxide but insufficient to form a flammable mixture, effecting reaction between said oxygen and said nitric oxide at a temperature sufficiently high and a pressure sufficiently low to maintain said alkane and alkenes in the gaseous phase, and recovering nitrogen dioxide from the resulting gas mixture at a temperature sufficiently high, and a pressure sufficiently low to maintain said alkane and alkenes in the gaseous phase.

3. A process for recovering nitric oxide from gaseous reaction products of the vapor phase nitration of methane, said gaseous reaction products containing unreacted methane carbon monoxide and nitric oxide, which comprises providing in said gaseous mixture sufficient methane to constitute at least 40% by weight of the resulting gas mixture after incorporating air in said mixture, then incorporating an excess of air over that necessary to oxidize said nitric oxide, but insufficient to form an inflammable mixture, effecting reaction between said nitric oxide and the oxygen of said air at a temperature sufficiently high and a pressure sufficiently low to maintain said methane in the gaseous phase, and recovering nitrogen dioxide from the resulting gas mixture at a temperature sufficiently high and a pressure sufficiently low to maintain said methane in the gaseous phase.

4. A process for recovering nitric oxide and alkanes from gaseous reaction products of the vapor phase nitration of an alkane having from 1 to 3 carbon atoms, said gaseous reaction products containing unreacted alkane, alkenes, carbon monoxide, and nitric oxide, the alkane being present in a major quantity, which comprises providing in said gaseous mixture sufficient of said hydrocarbon to constitute at least 40% by weight of the resulting gas mixture after incorporating air in said mixture then incorporating an excess of air over that necessary to oxidize said nitric oxide, but insufficient to form an inflammable mixture effecting reaction between said nitric oxide and the oxygen of said air, at a temperature sufficiently high and a pressure sufficiently low to maintain said alkane in the gaseous phase, absorbing nitrogen dioxide from the resulting gas mixture in water, at a temperature sufficiently high and a pressure sufficiently low to maintain said alkane in the gaseous phase, and recovering alkane from the residual gas mixture.

EDWARD B. HODGE.

---

CERTIFICATE OF CORRECTION.

Patent No. 2,309,845. February 2, 1943.

EDWARD B. HODGE.

It is hereby certified that error appears in the printed specification of the above numbered patent requiring correction as follows: Page 4, first column, line 25, for "alkaline" read --alkane--; and that the said Letters Patent should be read with this correction therein that the same may conform to the record of the case in the Patent Office.

Signed and sealed this 20th day of April, A. D. 1943.

(Seal)

Henry Van Arsdale,
Acting Commissioner of Patents.

CERTIFICATE OF CORRECTION.

Patent No. 2,309,845.  February 2, 1943.

EDWARD B. HODGE.

It is hereby certified that error appears in the printed specification of the above numbered patent requiring correction as follows: Page 4, first column, line 25, for "alkaline" read --alkane--; and that the said Letters Patent should be read with this correction therein that the same may conform to the record of the case in the Patent Office.

Signed and sealed this 20th day of April, A. D. 1943.

(Seal)

Henry Van Arsdale,
Acting Commissioner of Patents.